(12) United States Patent  
Wuggetzer et al.

(10) Patent No.: US 8,814,093 B2  
(45) Date of Patent: Aug. 26, 2014

(54) COVERING DEVICE FOR AN INTERIOR OF AN AIRCRAFT AND A METHOD FOR COVERING AN INTERIOR OF AN AIRCRAFT

(75) Inventors: Ingo Wuggetzer, Woerthsee (DE); Stefan List, Hamburg (DE); Nicolas Tschechne, Hamburg (DE); Tobias Mayer, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 19 days.

(21) Appl. No.: 13/419,496

(22) Filed: Mar. 14, 2012

(65) Prior Publication Data

US 2012/0175071 A1    Jul. 12, 2012

Related U.S. Application Data

(63) Continuation of application No. PCT/EP2010/063573, filed on Sep. 15, 2010.

(60) Provisional application No. 61/242,614, filed on Sep. 15, 2009.

(30) Foreign Application Priority Data

Sep. 15, 2009  (DE) .......................... 10 2009 041 597

(51) Int. Cl.
```
B64C 1/00      (2006.01)
B64D 11/00     (2006.01)
B64C 1/06      (2006.01)
```
(52) U.S. Cl.
CPC ................ B64C 1/066 (2013.01); B64D 11/00 (2013.01)
USPC ..................................... 244/129.1; 244/118.5

(58) Field of Classification Search
USPC ........ 244/118.5, 119, 129.1; 296/24.34, 97.8, 296/98, 100.15, 100.16, 100.18, 214, 219; 160/84.06, 327, 328, 329
See application file for complete search history.

(56) References Cited

U.S. PATENT DOCUMENTS 2,496,910 A    2/1950  Fridolph  
4,757,854 A *  7/1988  Rippberger ................... 160/391  
(Continued)

FOREIGN PATENT DOCUMENTS

DE        715265 C      12/1941  
DE      19537081 A1      4/1997  
(Continued)

OTHER PUBLICATIONS

German Patent Office, German Office Action dated Sep. 15, 2009 for German Patent Application No. 10 2009 041 597.1.

(Continued)

*Primary Examiner* — Timothy D Collins  
*Assistant Examiner* — Nicholas McFall  
(74) *Attorney, Agent, or Firm* — Ingrassia Fisher & Lorenz, P.C.

(57) ABSTRACT

A cladding apparatus is provided for the interior of an aircraft that includes, but is not limited to at least one two-dimensional fabric sheet, at least one guide device, and at least one tensioning element. The guide device is configured to be attached in the interior along a direction of extension of the interior, and slidably guide the fabric sheet at least in a first section of the interior along the direction of extension. The tensioning element is, furthermore, configured to be attached in the interior, and by producing a tensile force that acts on the front edge and/or the rear edge of the fabric sheet to stretch taut the fabric sheet along the direction of extension of the interior.

17 Claims, 14 Drawing Sheets

(56) References Cited

U.S. PATENT DOCUMENTS

| | | | |
|---|---|---|---|
| 5,385,377 A * | 1/1995 | Girard | 296/36 |
| 5,893,603 A | 4/1999 | Viertel et al. | |
| 6,086,133 A * | 7/2000 | Alonso | 296/97.8 |
| 6,186,587 B1 * | 2/2001 | Entenmann | 296/214 |
| 6,402,222 B1 * | 6/2002 | Avitsur | 296/97.8 |
| 6,481,486 B1 * | 11/2002 | Sanz et al. | 160/84.06 |
| 6,547,184 B2 | 4/2003 | Nieberle | |
| 6,837,460 B2 | 1/2005 | Guard et al. | |
| 7,455,263 B2 | 11/2008 | Lau et al. | |
| 7,785,694 B2 | 8/2010 | Mueller et al. | |
| 7,798,548 B2 | 9/2010 | Embach et al. | |
| 8,079,187 B2 | 12/2011 | Greiner | |
| 2006/0237585 A1 * | 10/2006 | Lau et al. | 244/118.5 |
| 2009/0283633 A1 | 11/2009 | Schneider | |
| 2010/0096500 A1 | 4/2010 | Benthien | |
| 2010/0264268 A1 | 10/2010 | Schneider | |

FOREIGN PATENT DOCUMENTS

| | | | |
|---|---|---|---|
| DE | 10127879 A1 | 7/2002 | |
| DE | 202005013023 U1 | 12/2006 | |
| DE | 102005040571 A1 | 3/2007 | |
| DE | 102007011627 A1 | 7/2008 | |
| DE | 102007019741 A1 | 10/2008 | |
| DE | 102007061423 A1 | 7/2009 | |
| EP | 1452397 A1 | 9/2004 | |
| EP | 1557355 A1 | 7/2005 | |
| WO | 2008090084 A2 | 7/2008 | |

OTHER PUBLICATIONS

International Searching Authority, International Search Report for International Application No. PCT/EP2010/063573 dated May 26, 2011.

State Intellectual Property Office of the People'S Republic of China, Office Action in Chinese Patent Application No. 201080041174.2, mailed Dec. 25, 2013.

* cited by examiner

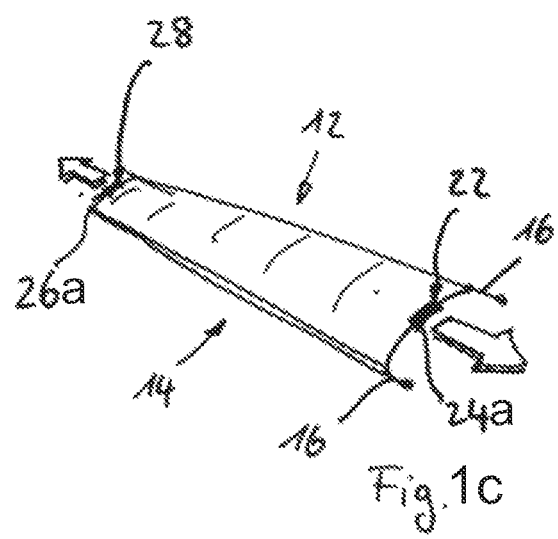

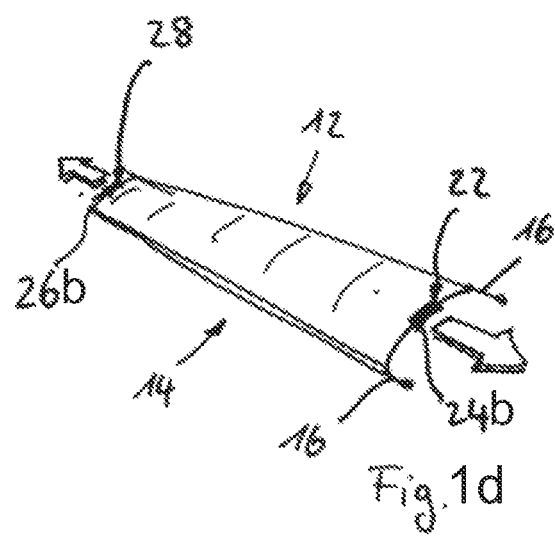

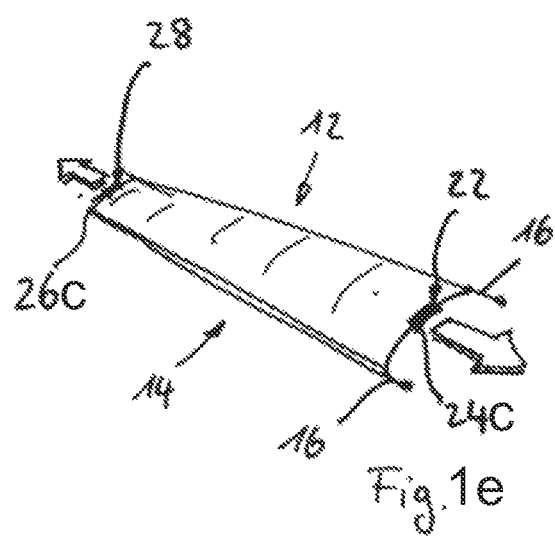

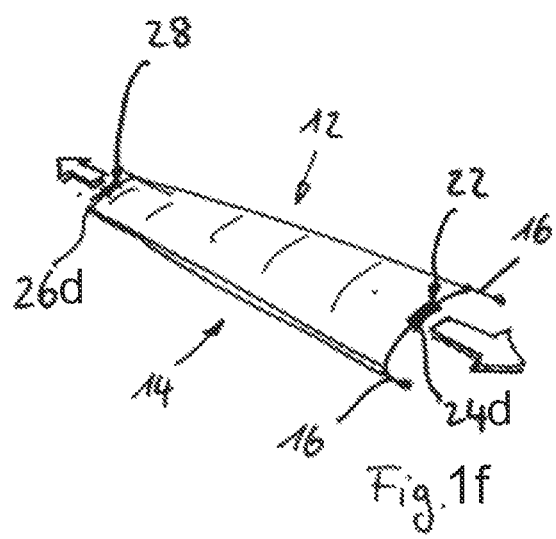

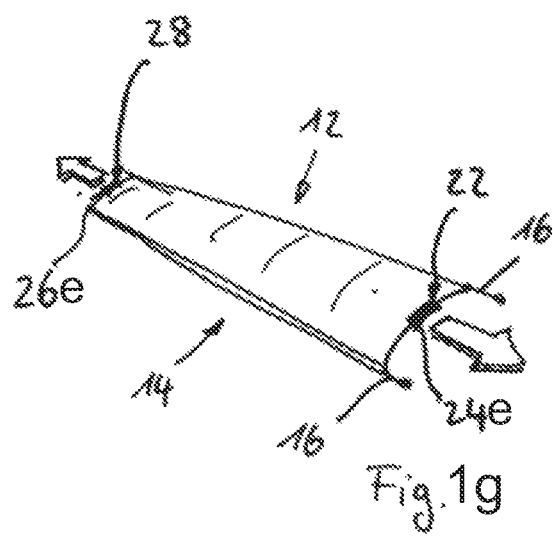

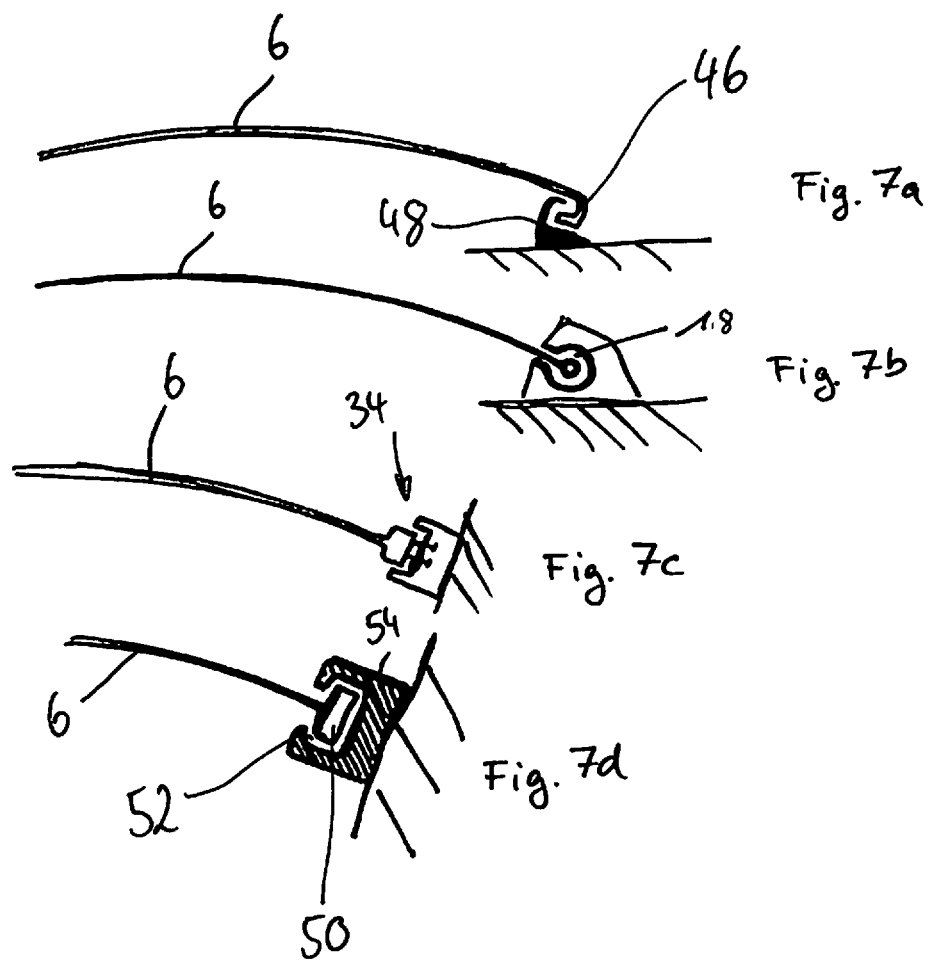

COVERING DEVICE FOR AN INTERIOR OF AN AIRCRAFT AND A METHOD FOR COVERING AN INTERIOR OF AN AIRCRAFT

CROSS-REFERENCE TO RELATED APPLICATIONS

This application is a continuation of International Application No. PCT/EP2010/063573, filed Sep. 15, 2010, which was published under PCT Article 21(2) and claims priority to U.S. Provisional Patent Application No. 61/242,614, filed Sep. 15, 2009 and also claims priority to German Patent Application No. 10 2009 041 597.1, filed Sep. 15, 2009, the of which applications are incorporated herein by reference.

TECHNICAL FIELD

The technical field relates to a cladding apparatus for the interior of an aircraft, to a method for cladding the interior of an aircraft, to the use of a two-dimensional fabric sheet for cladding the interior of an aircraft, and to an aircraft comprising at least one interior and at least one cladding apparatus.

BACKGROUND

At present for the purpose of cladding, in particular the ceilings of interiors of aircraft, individual ceiling panels are used which at points of affixation are attached to overhead bins or to structural regions arranged above them. For cladding, a ceiling and a multitude of separate ceiling panels are necessary, whose production is involved and cost-intensive as a result of the required lightweight design. Likewise, the individual alignment of the individual ceiling panels is of decisive importance and for this purpose in the state of the art special systems are frequently developed and used. The complexity and the expenditure for producing conventional ceiling cladding of an aircraft are thus very considerable.

DE 10 2007 011 627 A1 and WO 08 090 084 A2 show interior cladding for an aircraft, in which interior cladding the cladding panels are attached so as to be essentially horizontal or approximately vertical on a lining framework that comprises profiles for connection to a fuselage cell. DE 101 27 879 A1, EP 1 557 355 B1 and U.S. Pat. No. 6,547,184 show a passenger cabin of a commercial aircraft, which passenger cabin comprises fitting components and cladding components, for example individual lateral cladding components and individual ceiling cladding panels. From EP 1 452 397 A1 a vehicle ceiling structure comprising individual ceiling panels is known. The ceiling panels comprise a frame onto which an elastic fabric is stretched taut, and arranged in the interior of the frame an illumination element. The above-mentioned disadvantages result from the necessity to produce individual frames and to position them correctly in the interior of the aircraft.

Furthermore, in the state of the art it is common for illumination devices to be arranged on each individual ceiling panel so that for individual modifications of the illumination concept by an aircraft operator it is practically impossible, in the context of producing a standardized design based on series production of the aircraft, to implement an economical solution. Because of the use of individual ceiling panels and because of unavoidable changes in the length of the aircraft between individual operating phases, furthermore regular gaps between ceiling panels are necessary, by means of which gaps the changes in length can be compensated for. Moreover, the gaps need to be sealed with very flexible sealing elements in order to prevent dripping condensed water from entering the interior of the aircraft. This could overall result in an imbalanced and non-uniform external appearance.

In view of the foregoing, at least one object is to provide a cladding apparatus for an interior of an aircraft, which cladding apparatus obviates the need to produce individual separate ceiling panels and to have to attach them precisely in predetermined installation positions on a cabin ceiling or the like of an aircraft. Equally, at least another object is to provide such cladding apparatus that is as economical as possible to produce, is of a lightweight design, and can be installed with little expenditure quickly and reliably in the interior. In addition, other objects, desirable features, and characteristics will become apparent from the subsequent summary and detailed description, and the appended claims, taken in conjunction with the accompanying drawings and this background.

SUMMARY

According to a first embodiment, a cladding apparatus is proposed that comprises at least one two-dimensional fabric sheet, at least one guide device and at least one tensioning element. In this arrangement the guide device is designed to be attached in the interior along a direction of extension of the interior, and to slidably guide the fabric sheet at least in a first section of the interior along the direction of extension. The tensioning element in turn is designed to be attached in the interior, and by producing a tensile force that acts on the front edge and/or the rear edge of the fabric sheet to stretch taut the fabric sheet along the direction of extension of the interior.

In the context of the invention the term "two-dimensional fabric sheet" relates to any flexible and limp, respectively, and essentially two-dimensional structures of any desired suitable material, for example comprising canvas, fabric, mats, foils, linen, mesh fabrics, mesh canvas, mesh foils and the like. In order to reduce or eliminate condensed water dripping, which condensed water can arise between the fabric sheet and the top of the interior, the fabric sheet could be substantially waterproof or waterproof, or at least able to distribute condensed water in the area of the fabric sheet in such a manner that it can slowly evaporate thereon.

The tensioning element is arranged within the interior of the aircraft in such a manner that the fabric sheet can be stretched taut within the interior of the aircraft in one direction of extension of the interior by means of the tensioning element. To this effect, for taking up a first end of the fabric sheet a fastening element could be arranged in the interior of the aircraft, on which fastening element the first end of the fabric sheet can be fastened. At the second end, which is opposite the fastening element, the tensioning element can be arranged so that, by means of the application of tensile force, the fabric sheet extending from the fastening element to the tensioning element can be tensioned in such a manner that the fabric sheet extends tautly in the corresponding part of the interior, for example a ceiling section between two monuments that reach up to the ceiling, thus completely covering the aforesaid.

This provides the technical effect in which a fabric sheet stretched taut like a type of "ceiling sail" can extend along a relatively long section of the interior of the aircraft where it can provide a cladding function. There is no need to provide a larger surface to be clad in the interior with individual ceiling panels or the like. In order to compensate for changes in length in the aircraft the fabric sheet could be designed so as to be elastic so that even in its taut state it is longitudinally stretchable and in the case of torsion is transversely stretchable.

When dividing the interior of an aircraft into several cabin sections, for example the ceiling of each cabin section can be clad by one or several fabric sheets. This also results in flexible handling and opening of the ceiling lining being possible for reaching systems or installations arranged in the ceiling region, for example in the case of maintenance. To this effect it is also useful to arrange closure devices, for example zips or hooks and loop fasteners, on the fabric sheet or on one end of the fabric sheet for opening the fabric sheet when required. In addition it would also be possible to design one end of the fabric sheet as a closure fold that overlaps a structurally stable fastening element in a closed state. This overlap could be fixable by a press stud, a buckle closure, a zip, a hook and loop closure or some other types of closure. The guide device essentially serves to allow precise guidance of the edges of the fabric sheet, for example if the fabric sheet extends in longitudinal direction of the interior of the aircraft, so that not only is the installation simplified, but also in the case of vibration, acceleration and contact, the fabric sheet remains in its predetermined position.

Any devices that allow unrestricted movement of the fabric sheet along the direction of extension of the guide devices can be used as guide devices. For example, slidable positive-locking connections with engaging element combinations and groove combinations could be considered for use as such devices, as could slide systems, linear guide systems and the like. It would, for example, be imaginable to provide a guide rail as a guide device, which guide rail could be arranged on a structure or on built-in devices within the interior of the aircraft and could comprise a hollow space, which is open towards the interior by means of a slit, comprising an undercut profile, wherein the ends of the guide rail are open. Such a guide rail advantageously comprises a cross section that makes it possible to insert and slide a correspondingly formed guide element in longitudinal direction, while at the same time preventing movement across the extension of the rail. A guide element formed in this manner could be arranged on a lateral edge of the fabric sheet so that the fabric sheet, starting from the hollow space of the guide rail, extends through the slit into the interior of the aircraft. If two such guide devices are arranged parallel to each other in the interior of the aircraft, a fabric sheet that on two opposite edges comprises a correspondingly formed guide element can be inserted into the guide rails, and consequently a guided movement of the fabric sheet in the direction of extension of the guide rails or of the interior is implemented. Preferably, the guide device is designed to be attached to at least one overhead bin. In this manner a fabric sheet can implement particularly advantageous ceiling cladding of the interior.

The tensioning element can be implemented in the form of screw elements, a ratchet system, buckle elements, a clamp system, and motorized pulling devices or in some other manner. The tensioning element can be arranged either on one end or on two ends of a fabric sheet.

According to another embodiment, stiffening elements are arranged transversely, longitudinally, diagonally or in any direction in between for supporting the tautly stretched fabric sheet on the cladding apparatus in order to bring about a defined spatially curved form, for example, a dome-shaped form or a planar form, of the fabric sheet in order to generate transverse tension, or generally in order to achieve dimensional stability of the fabric sheet. Furthermore, it is imaginable that as a result of suitable materials characteristics the fabric sheet can independently assume a curved shape in its tautly stretched state, and can maintain this shape in a stable manner.

In addition, the integration of illumination elements in front of, on, or behind the fabric sheet is possible. The easy exchangeability and the flexibility in the shape of the combination comprising the illumination elements and the fabric sheet are particularly advantageous. Illumination equipment could also be integrated directly in the fabric sheet by weaving-in or by some other production methods. In addition, the fabric sheet could be designed so as to be transparent or partly transparent so that the light produced at the side of the fabric sheet pointing away from the interior at predetermined positions can exit into the interior of the aircraft.

Furthermore, a method for cladding the interior of an aircraft is provided that comprises the essential process-related steps of putting in place a two-dimensional fabric sheet in the interior; inserting the fabric sheet into at least one guide device; attaching at least one tensioning element in the interior; and stretching taut the fabric sheet by means of the at least one tensioning element. Preferably, in relation to each fabric sheet at least one fastening element is attached in the interior of the aircraft on an end of the fabric sheet, which end is opposite the tensioning element, and subsequently the fabric sheet is attached to the fastening element, and then the end of the fabric sheet, which end is opposite the fastening element, is stretched taut by the tensioning element.

In addition, use of a two-dimensional fabric sheet is provided, which can be stretched taut in one direction of extension of the interior of an aircraft, for cladding at least one region of the interior.

Finally, an aircraft comprising at least one interior and at least one cladding apparatus according to the previously described embodiments. If an aircraft comprises more than one cabin section, it is particularly favorable if each cabin section comprises a separate cladding apparatus, and if correspondingly several fabric sheets are integrated in the interior. Attaching the guide devices to overhead bins for providing a continuous or an interrupted guide for the fabric sheets is particularly favorable in the case of ceiling cladding. As an alternative to the attachment of separate guide devices it is also imaginable that already at the time of manufacture of overhead bins the guide devices are completely integrated by a corresponding shape of the housing of the overhead bins.

The particular advantage of the cladding apparatus not only has the particularly simple installation, but also of the lightweight construction and the flexibility in terms of individual designs as desired by customers.

BRIEF DESCRIPTION OF THE DRAWINGS

Further characteristics, advantages and application options of the embodiments are disclosed in the following description of the exemplary embodiments and of the figures. All the described and/or illustrated characteristics per se and in any combination form the subject of the embodiments of invention, even irrespective of their composition in the individual claims or their interrelationships. Furthermore, identical or similar components in the figures have the same reference characters.

FIG. 1a to FIG. 1g show exemplary embodiments of the cladding apparatus according to the present disclosure;

FIG. 7a-FIG. 7d show different guide devices;

DETAILED DESCRIPTION

The following detailed description is merely exemplary in nature and is not intended to limit application and uses. Furthermore, there is no intention to be bound by any theory presented in the preceding background or summary or the following detailed description.

Figure 1A:
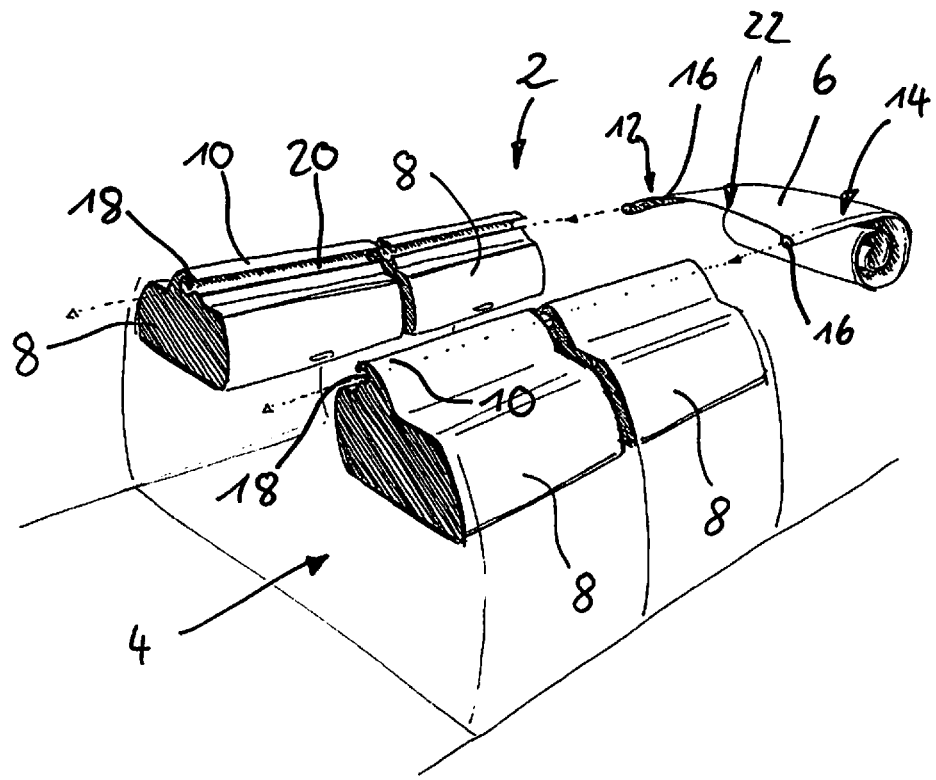

FIG. 1a shows a first exemplary embodiment of a cladding apparatus 2 according to the invention for the interior 4 of an aircraft. A two-dimensional fabric sheet, which in FIG. 1a is, for example, limp, is shown in its rolled-up state shortly before installation in the interior 4; in this state the fabric sheet 6 can very easily be transported to the interior 4. As an alternative, the fabric sheet can also be brought to the interior 4, through an access door, in a folded state, or, should it not be limp, in a bent state. In the interior 4 numerous overhead bins 8 are arranged to which, for example, in each case a guide device 10 is affixed. This need not necessarily mean that the guide devices 10 are manufactured separately of the overhead bins 8 and are then installed thereon; the guide devices 10 could equally be integrated directly in the housing of the overhead bins 8. Likewise, it could also be imaginable not to equip each overhead bin 8 with guide devices 10 but only some of said overhead bins 8.

Figure 1B:
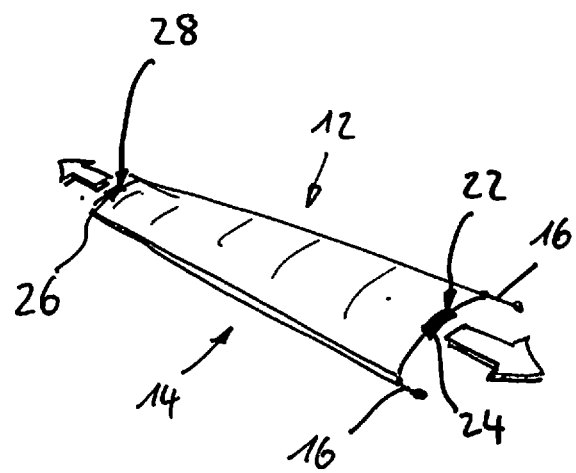

In its unrolled state, as shown in FIG. 1b, the two-dimensional fabric sheet 6 comprises an elongated shape, and on the lateral edges 12 and 14 guide elements 16 are arranged that are designed in such a manner that they can be guided in a corresponding hollow space 18 of the guide devices 10. The hollow spaces 18 comprise an undercut profile cross section that is open with a slit 20 towards the interior 4. In this manner, while the guide elements 16 can easily be inserted into the guide devices 10 and can be displaced therein, at the same time any movement in a direction across the guide devices 10 is prevented. The fabric sheet 6 is dimensioned in such a manner that it can extend between the overhead bins 8 along the interior 4 of the aircraft where it can be stretched taut.

Installation of a fabric sheet 6 in the interior 4 of an aircraft takes place, for example, in such a manner that the fabric sheet 6 is transported in its rolled up state into the interior 4 of the aircraft, and a front edge 22 of said fabric sheet 6 is first inserted into guide devices 10 and is then completely pushed through so that the entire fabric sheet 6 is taken up by the guide devices 10.

FIG. 1b shows an unrolled fabric sheet 6 which for affixation within the interior 4 can be stretched taut by means of tensioning elements 24 and 26 on a front edge 22 and on a rear edge 28. To ensure taut stretching of the fabric sheet 4 it is not necessary to use two tensioning elements 24 and 26; instead, one of the two tensioning elements 24 and 26 can also be replaced by any fastening element having a non-positive locking effect or a positive-locking effect, so that tension force acting onto the fabric sheet 6 only has to be provided by the front edge 22 or the rear edge 28.

FIG. 1c shows an unrolled fabric sheet 6 which for affixation within the interior 4 can be stretched taut by means of tensioning elements 24a and 26a on a front edge 22 and on a rear edge 28. In this example, the tensioning elements 24a and 26a comprise screw elements.

FIG. 1d shows an unrolled fabric sheet 6 which for affixation within the interior 4 can be stretched taut by means of tensioning elements 24b and 26b on a front edge 22 and on a rear edge 28. In this example, the tensioning elements 24b and 26b comprise ratchet systems.

FIG. 1e shows an unrolled fabric sheet 6 which for affixation within the interior 4 can be stretched taut by means of tensioning elements 24c and 26c on a front edge 22 and on a rear edge 28. In this example, the tensioning elements 24c and 26c comprise buckle elements.

FIG. 1f shows an unrolled fabric sheet 6 which for affixation within the interior 4 can be stretched taut by means of tensioning elements 24d and 26d on a front edge 22 and on a rear edge 28. In this example, the tensioning elements 24d and 26d comprise clamp systems.

FIG. 1g shows an unrolled fabric sheet 6 which for affixation within the interior 4 can be stretched taut by means of tensioning elements 24e and 26e on a front edge 22 and on a rear edge 28. In this example, the tensioning elements 24e and 26e comprise a motorized pulling device.

Preferably, the fabric sheet 6 is made from an elastic material so that longitudinal variability can be achieved so that longitudinal movement, transverse torsion or other changes in the shape of the aircraft fuselage, which changes in shape are due to operational reasons, can be compensated for.

The tensioning elements 24 and 26 should be designed to exert a tensile force on the fabric sheet, and to fix the front edge 22 and/or the rear edge 28 of the fabric sheet in such a position that a tensile force is maintained.

The guide devices shown are to be interpreted as being examples only. Any guide devices are imaginable that ensure reliable guidance of the fabric sheet 6 along a distance to be clad. Apart from the combination comprising guide devices 10 and guide elements 16 it is also possible to use fastening elements that allow displacement in longitudinal direction and fastening in transverse direction. Such fastening elements could be arranged at even spacing or at irregular spacing on the lateral edges 12 and 14 of the fabric sheet 6.

Figure 2A:
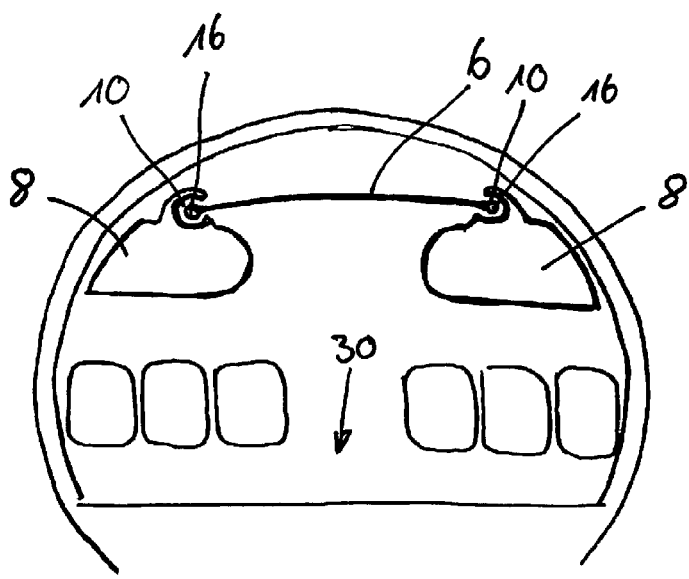
FIG. 2a-FIG. 2c show different interiors of an aircraft comprising the apparatus according to an embodiment.
Figure 2B:
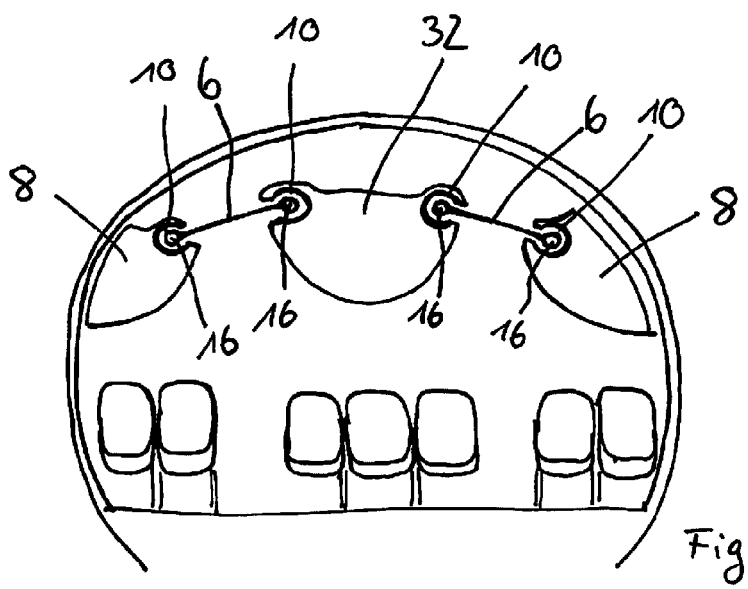

The embodiment of the interior 4 of the aircraft, which embodiment is shown in FIG. 2a, essentially corresponds to the depiction shown in FIG. 1a and forms a medium-sized short- or medium-haul aircraft with a single center aisle 30 and overhead bins 8 arranged only on two sides. Of course, it is also possible to equip aircraft fuselages comprising a larger radial extension and three or more rows of overhead bins 8 with the cladding apparatus according to the invention. At this stage it should be pointed out that the illustrations of the designs of the interiors shown are not significant in the context of the invention. Short- and medium-haul aircraft can also comprise two aisles and only two rows of hat racks. Furthermore, the fabric sheet 6 can also be affixed exclusively to structural elements if in the respective section of the interior 4 in some regions no hat racks are installed, for example in a business class section. As an example, FIG. 2b shows the fuselage cross section of a larger medium- or long-haul aircraft comprising two outer overhead bins 8 and a central overhead bin 32 arranged in between. In each case fabric sheets 6 can extend in guide directions 10 between the outer overhead bins 8 and the center overhead bin 32. Each of the fabric sheets 6 comprises its own tensioning element, which is not shown in detail in FIG. 2b.

Figure 2C:
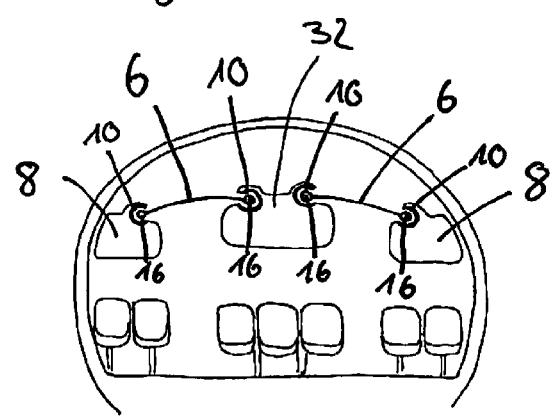

FIG. 2c shows the integration of the cladding apparatus according to an embodiment in a similar fuselage cross section as shown in FIG. 2b, but with different overhead bins 8 and 32.

Figure 3A:
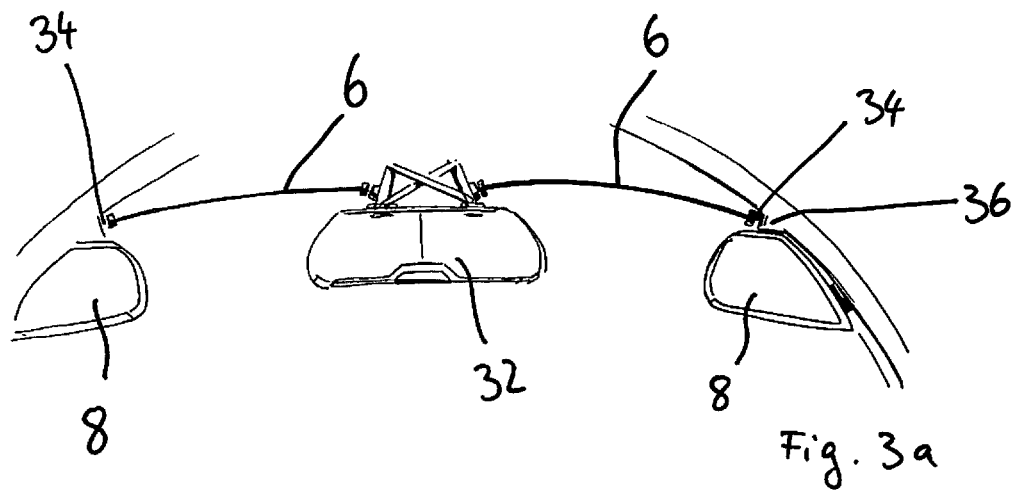
FIG. 3a and FIG. 3b show different variants of guide devices.
Figure 3B:
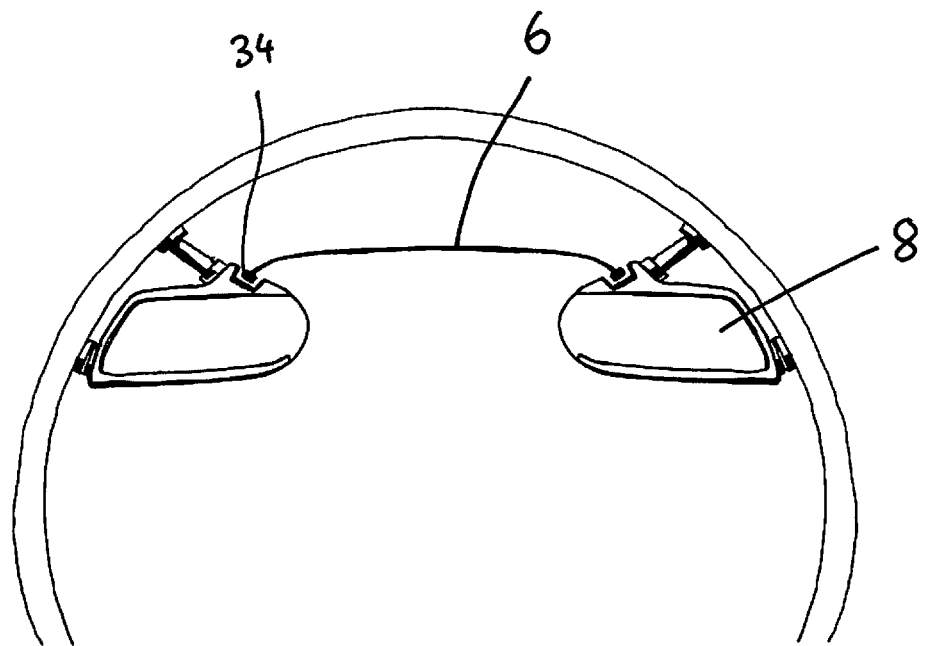

FIG. 3a and FIG. 3b show different guide devices 34 that are implemented in the manner of rails. Such guide devices 34 cannot be arranged directly in the housing of overhead bins 8 as shown in FIG. 3b, but as in FIG. 3a also on structural regions 36 that can be arranged above the overhead bins 8 or adjacent to them.

Figure 4A:
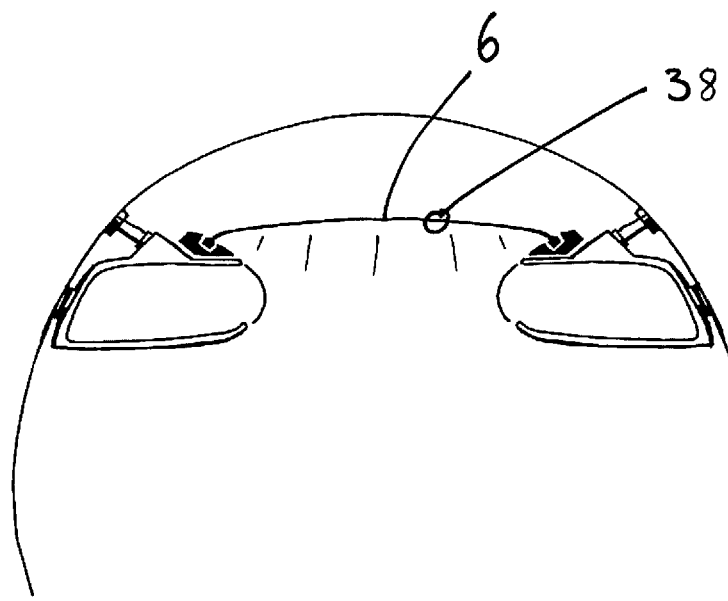
FIG. 4a and FIG. 4b show an exemplary embodiment of the cladding apparatus according to an embodiment with different illumination devices.
Figure 4B:
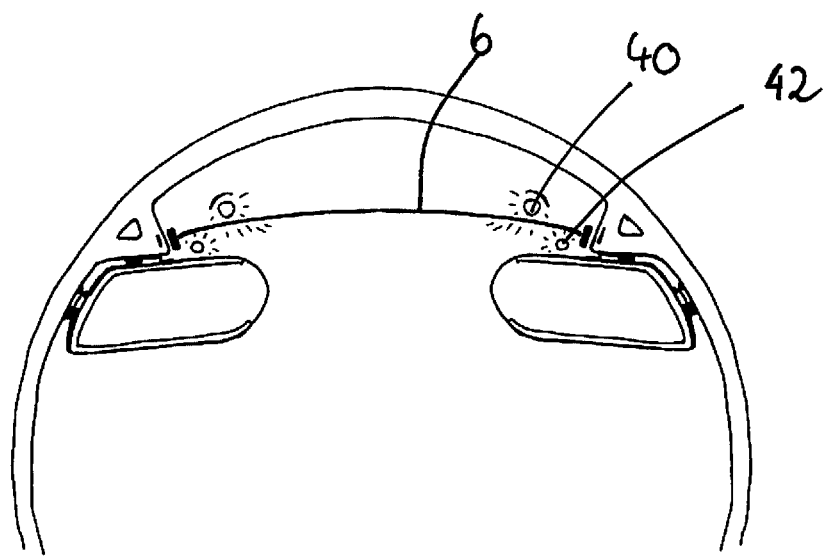

By means of suitable materials selection relating to the fabric sheet 6 the cladding apparatus 2 can be particularly suited to combine illumination functions with cladding functions. FIG. 4a and FIG. 4b show examples of two different illumination applications.

In FIG. 4a linear illumination equipment 38 could, for example, be integrated directly in the fabric sheet 6, for example by weaving, so that the fabric sheet 6 comprises luminescent properties. Likewise, according to FIG. 4b, illumination equipment 40 could be arranged behind the fabric sheet 6, facing away from the interior 4, so that light can pass uniformly through a transparent, partially transparent or translucent fabric sheet 6. With a corresponding color design and material design of the fabric sheet 6 glare-free light of an agreeable luminance color can be produced.

As an alternative, illumination equipment 42 is arranged on the side of the fabric sheet 6 facing the interior 4, and direct radiation of said illumination equipment 42 into the interior 4 could be prevented by the overhead bins 8 arranged in front of the illumination equipment 42. This provides adequately bright, indirect and thus non-blinding, light, which could be optimized by corresponding materials selection and/or color design of the fabric sheet 6.

Figure 5A:
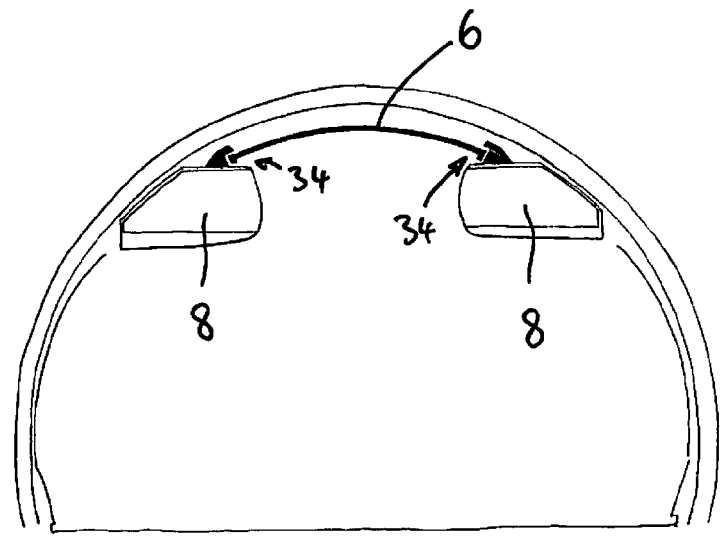
FIG. 5a-FIG. 5c show further modifications of the cladding apparatus according to an embodiment.
Figure 5B:
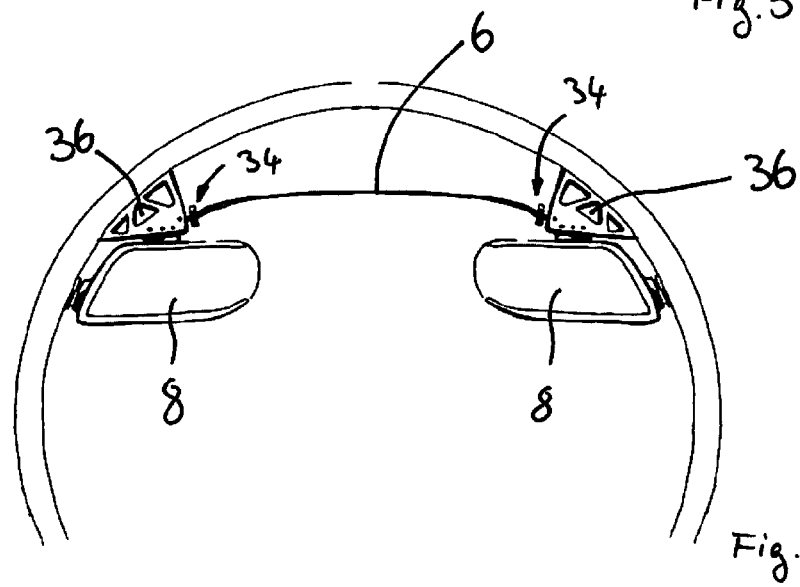
Figure 5C:
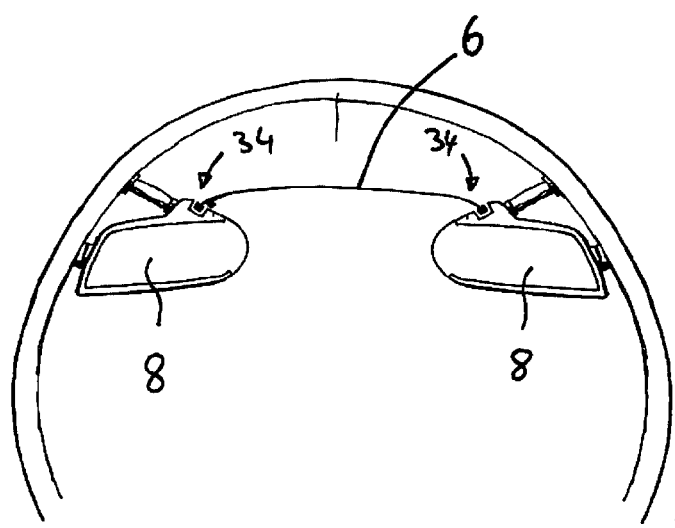

FIG. 5a, FIG. 5b and FIG. 5c show examples of attachment surfaces for guide devices 34, which attachment surfaces could also be used for guide devices 10 of FIG. 1a. Thus, FIG. 5a shows the guide device 34 in place on top of an overhead bin 8. FIG. 5b shows the attachment of the guide device 34 on a structural region 36, and FIG. 5c demonstrates integration of the guide device 34 in the housing of the overhead bin 8.

Figure 6A:
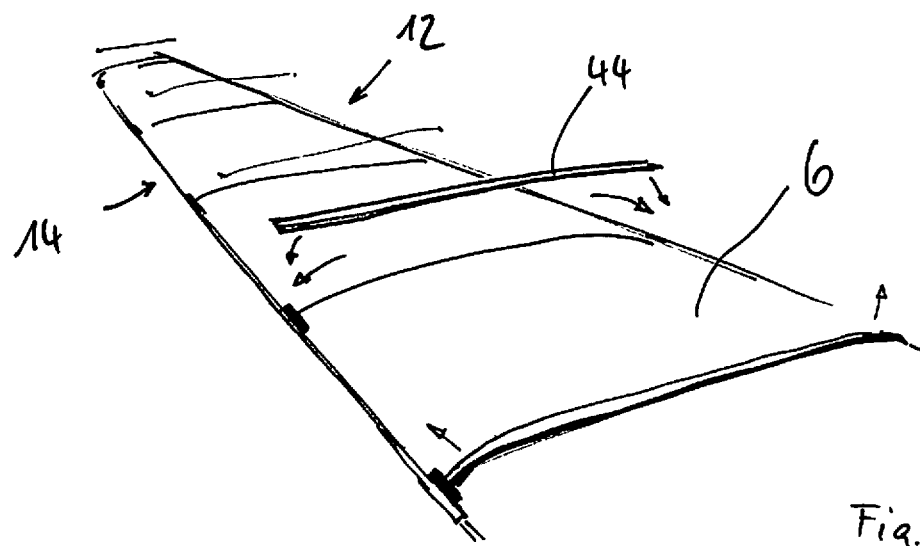
FIG. 6a and FIG. 6b demonstrate stiffening elements for shaping.
Figure 6B:
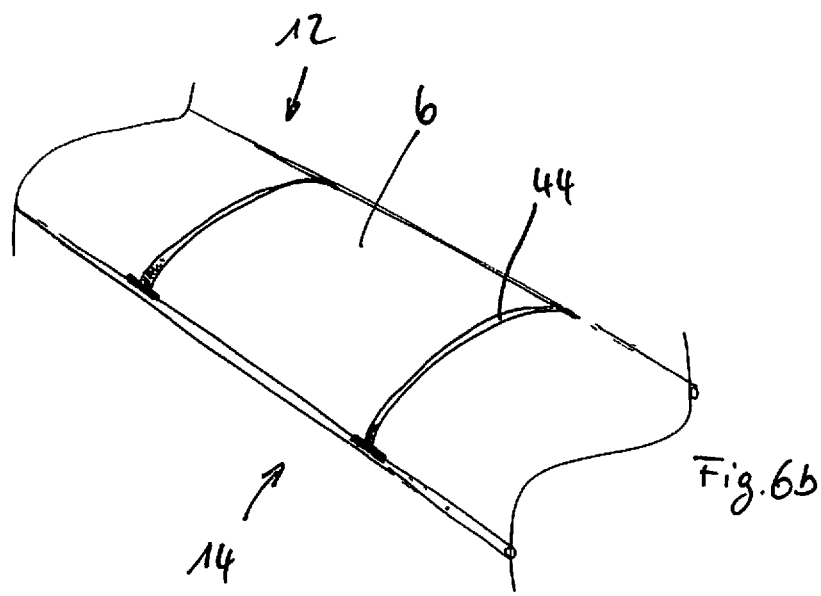

FIG. 6a and FIG. 6b show additional stiffening elements 44 that could be used to impart a curved shape to the fabric sheet 6, which shape could not be implemented solely by tensioning the fabric sheet 6. The stiffening elements 44 could be elastic and could bend to a curved shape as a result of being clamped between two opposite guide devices 10 and 34, which curved shape is controlled by the longitudinal difference between a stiffening element 44 with no load and the distance between two opposite guide devices 10 and 34. As an alternative to this the stiffening elements 44 could also be used to generate adequate transverse tension and/or to support a planar shape of the fabric sheet. The stiffening elements 44 could be woven, bonded, inserted or in some other manner attached, in a kind of pocket, to the material of the fabric sheet.

FIG. 7a-FIG. 7d show examples of various guide devices which do not, however, claim to be exhaustive. Any other guide devices that make it possible to guide a fabric sheet 6 along a direction of extension of the interior could be used for the cladding apparatus. FIG. 7a shows a variant of a guide device in which two hook-shaped edge profiles 46 and 48 interact, and the hook-shaped edge profile 46 is arranged on the fabric sheet 6, and the hook-shaped edge profile 48 is arranged on a fixed point in the interior 4 of the aircraft. The principle shown in FIG. 7b is similar to the principle, for example, of FIG. 1a, in which a guide element 16 extends in a hollow space 18 of a guide device 10, and the guide element 16 is connected to the fabric sheet 6. FIG. 7c shows in detail the rail principle of the guide devices 34, which rail principle is shown in FIG. 3a and FIG. 3b. Finally, FIG. 7d shows a modification of the principle from FIG. 7b, in which a flat, wide guide element 50 extends in a correspondingly shaped hollow space 52 of a guide rail 54, wherein the guide element 50 is connected to the fabric sheet 6.

Figure 8:
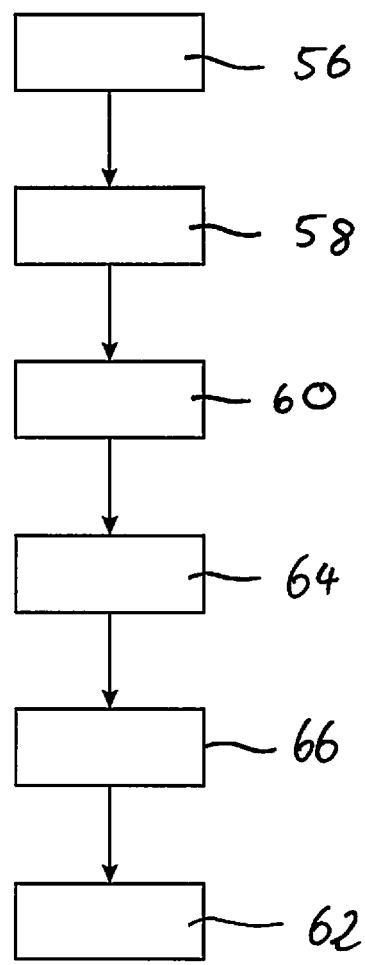
FIG. 8 shows a diagrammatic block view of the method according to an embodiment.

FIG. 8 diagrammatically presents the method according to an embodiment, which method essentially comprises the following steps. After putting in place 56 a two-dimensional fabric sheet 6 in the interior 4 of an aircraft, the fabric sheet 6 is slid into at least one guide device 58. At least one tensioning element is attached 60 in the interior 4, and the fabric sheet 6 is stretched taut 62 with at least one tensioning element. Prior to attachment of the tensioning element it is also possible to attach 64 a fastening element in the interior 4, on which fastening element an end of the fabric sheet can be fastened 66. It is also possible to carry out the steps in a different sequence.

Figure 9:
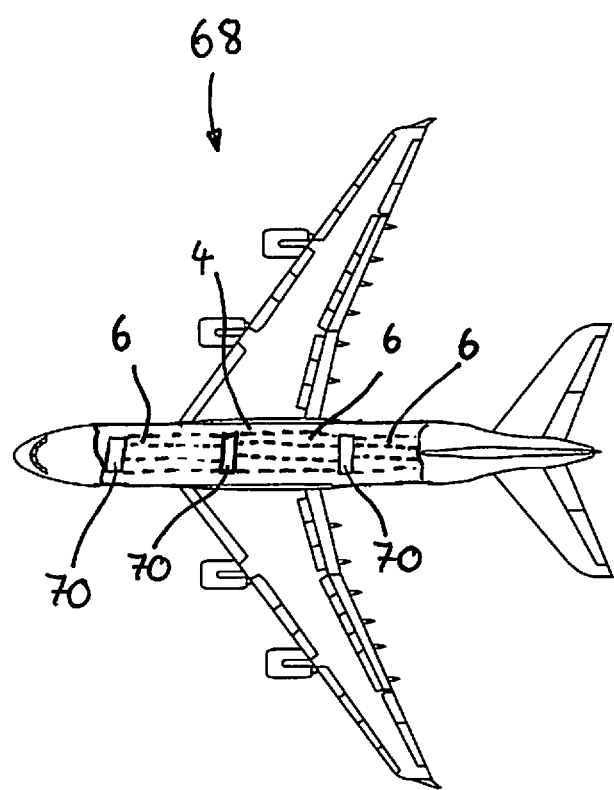
FIG. 9 shows an aircraft comprising at least one interior and several cladding apparatuses according to the invention which are arranged in said interior.

Finally, FIG. 9 shows an aircraft with an interior 4 in which, for example, monuments 70 are arranged whose interspaces form cabin sections, each being clad by two cladding apparatuses that extend parallel to each other, with each of the aforesaid comprising a fabric sheet 6 on the ceiling. Particularly advantageously the individual fabric sheets 6 have been individually stretched taut so that the ceiling cladding of each cabin section can easily be opened by undoing the respective fabric sheet 6, for example in order to gain access to systems in the ceiling region when maintenance is required.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A cladding apparatus for a ceiling of an interior of an aircraft, comprising:
   a two-dimensional fabric sheet having a front edge opposite a rear edge;
   a guide device; and
   a tensioning element on the front edge of the fabric sheet;
   wherein the guide device is attachable in the interior along a direction of extension of the interior, and slidably guides the fabric sheet at least in a first section of the interior along the direction of extension,
   wherein the tensioning element is attachable in the interior, and produces a tensile force that acts on the front edge of the fabric sheet in the direction of extension of the interior to stretch taut the fabric sheet along the direction of extension of the interior.

2. The cladding apparatus of claim 1, further comprising a fastening element that is configured for positioning in the interior and to fasten the edge, which is opposite the tensioning element of the fabric sheet relative to the interior.

3. The cladding apparatus of claim 1, wherein the fabric sheet is elastic and configured to compensate for changes in length and transverse movements of the interior in the stretched taut state.

4. The cladding apparatus of claim 1, wherein the guide device is configured for attachment to an overhead bin.

5. The cladding apparatus of claim 1, wherein the guide device is a guide rail.

6. The cladding apparatus of claim 1, wherein the tensioning element is a screw element.

7. The cladding apparatus of claim 1, wherein the tensioning element is ratchet systems.

8. The cladding apparatus of claim 1, wherein the tensioning element is buckle elements.

9. The cladding apparatus of claim 1, wherein the tensioning element is clamp systems.

10. The cladding apparatus of claim 1, wherein the tensioning element is motorized pulling device.

11. The cladding apparatus of claim 1, further comprising a stiffening element that is configured to support a shape of the tautly stretched fabric sheet.

12. The cladding apparatus of claim 1, further comprising an illumination device that is configured for an arrangement that is spaced apart from the fabric sheet.

13. The cladding apparatus of claim 1, further comprising an illumination device that is configured for an arrangement that is integrated in the fabric sheet.

14. The cladding apparatus of claim 12, wherein the fabric sheet is at least partially transparent in at least some sections.

15. The cladding apparatus of claim 1, further comprising a second tensioning element that acts on the rear edge of the fabric sheet and produces a second tensile force that acts on the rear edge.

16. An aircraft comprising:
an interior; and
a cladding apparatus, comprising:
a two-dimensional fabric sheet having a front edge opposite a rear edge;
a guide device; and
a first tensioning element on the front edge of the fabric sheet and produces a first tensile force that acts on the front edge in a first direction;
a second tensioning element that acts on the rear edge of the fabric sheet and produces a second tensile force that acts on the rear edge in a second direction, the second direction opposite the first direction;
wherein the guide device is attachable in the interior along a direction of extension of the interior, and slidably guides the fabric sheet at least in a first section of the interior along the direction of extension,
wherein the first tensioning element and second tensioning element are attachable in the interior, and the first tensioning element and second tensioning element stretch taut the fabric sheet along the direction of extension of the interior.

17. The aircraft of claim 16,
wherein the interior is divided into at least a first interior section and a second interior section, and
wherein the first interior section and the second interior section each comprise a separate tautly stretched fabric sheet.

* * * * *